Dec. 29, 1931.  B. M. SHIPLEY  1,838,579
CASH REGISTER
Filed July 13, 1925   10 Sheets-Sheet 1

Inventor
Bernis M. Shipley.
By Carl Beust
Henry E. Stauffer
His Attorneys

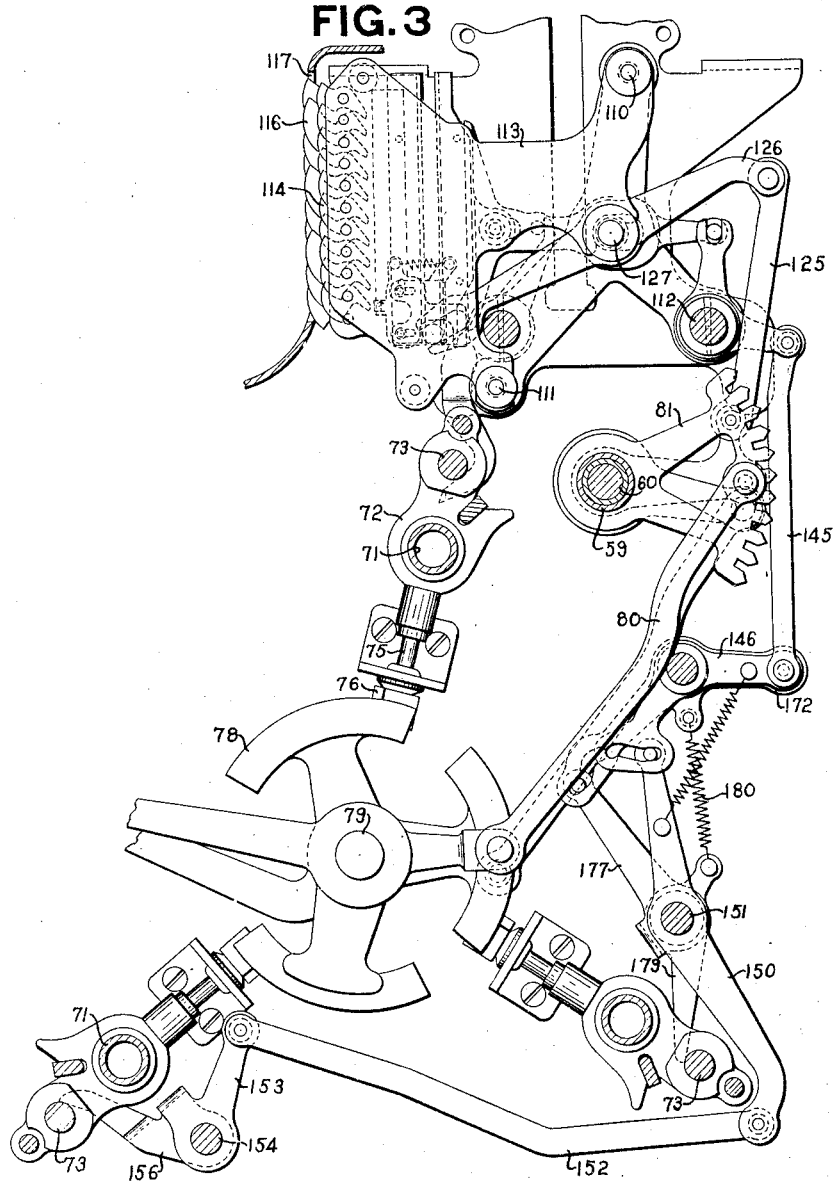

Dec. 29, 1931.     B. M. SHIPLEY     1,838,579
CASH REGISTER
Filed July 13, 1925     10 Sheets-Sheet 4
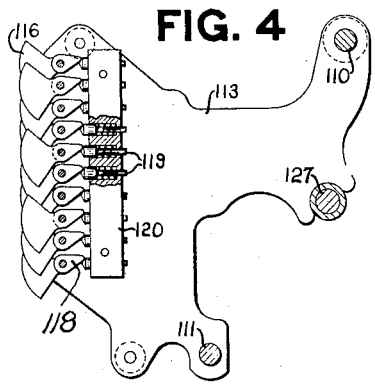
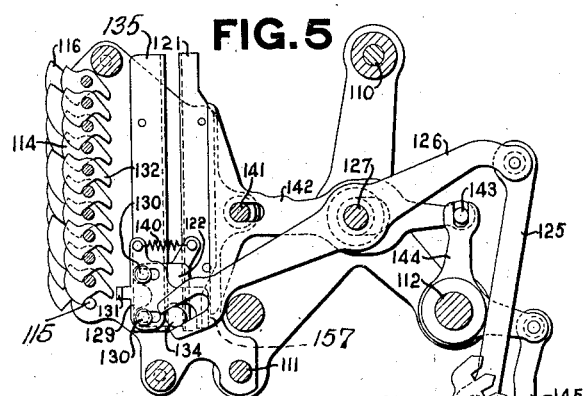
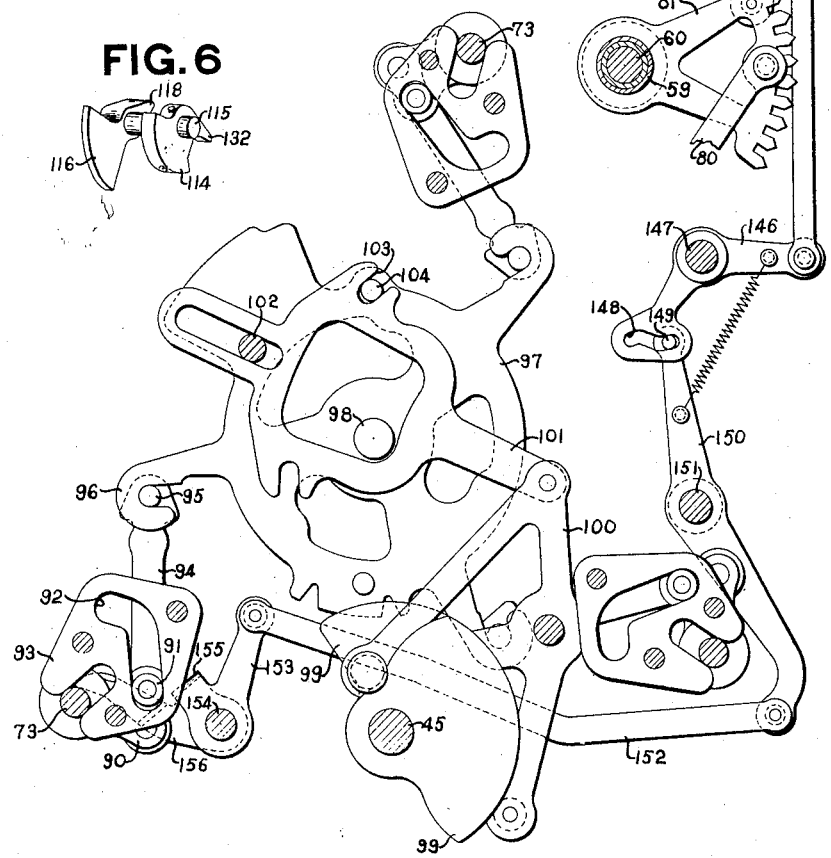
Inventor
Bernis M. Shipley
By Earl Beust
Henry E Stauffer
His Attorneys

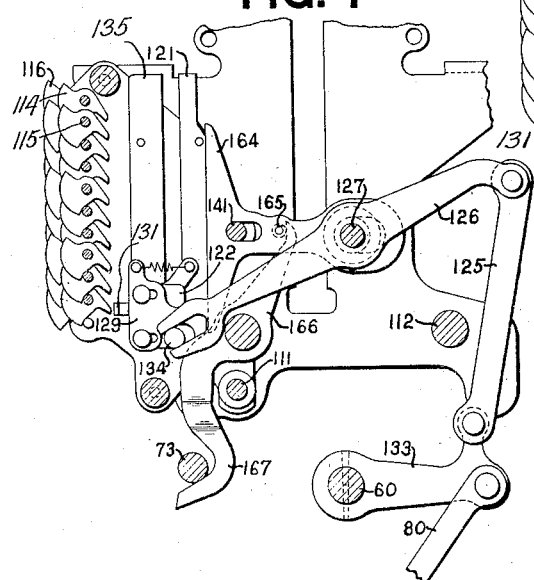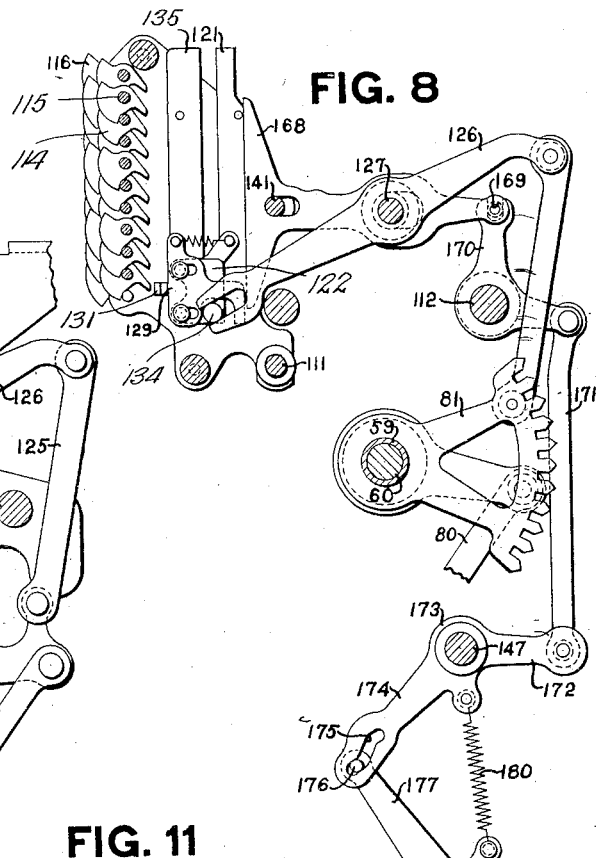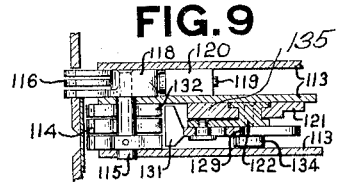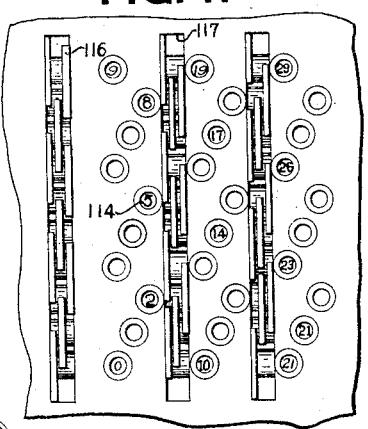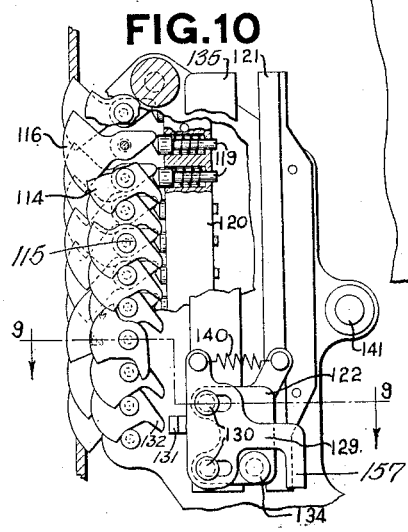

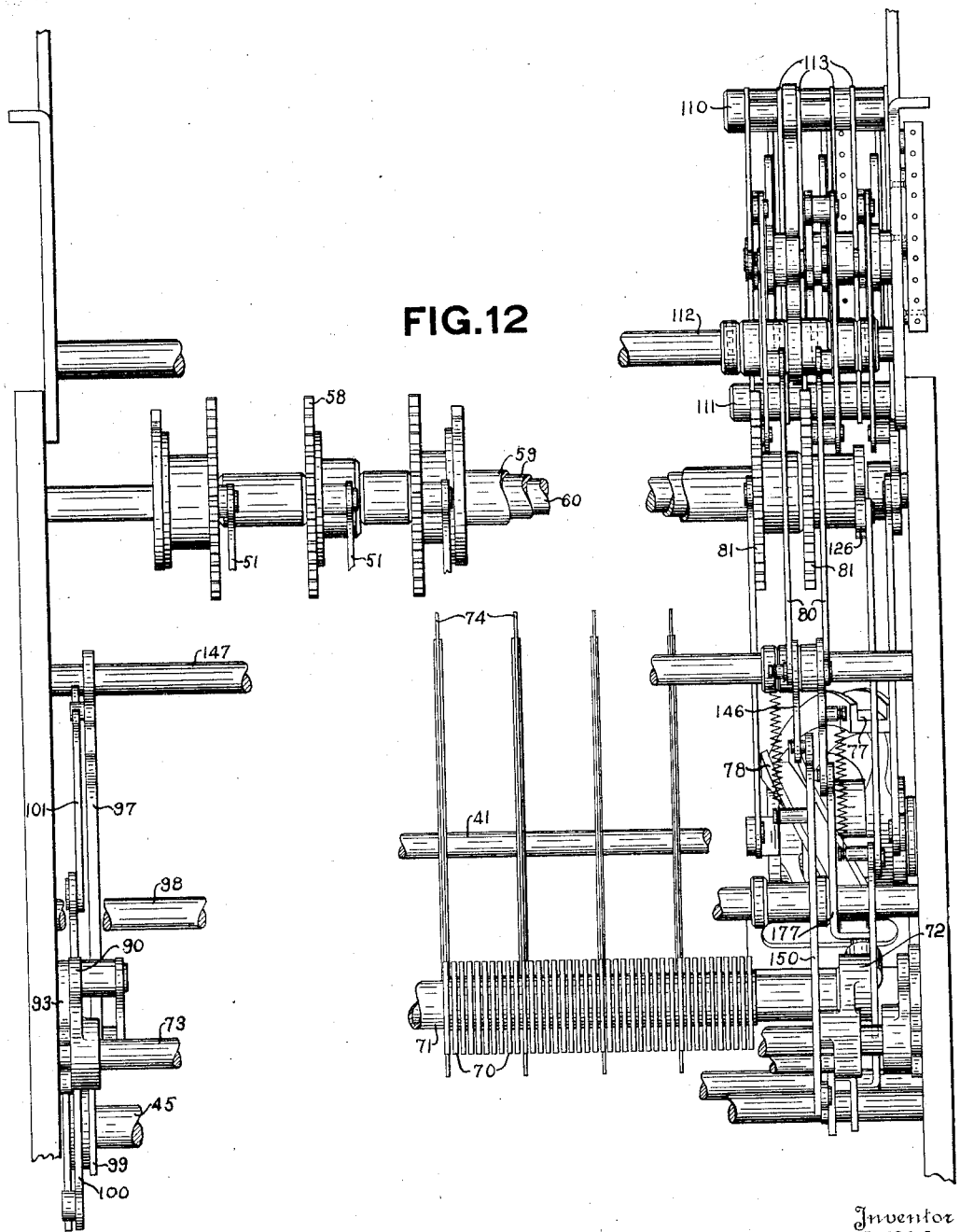

Dec. 29, 1931. B. M. SHIPLEY 1,838,579
CASH REGISTER
Filed July 13, 1925 10 Sheets-Sheet 7
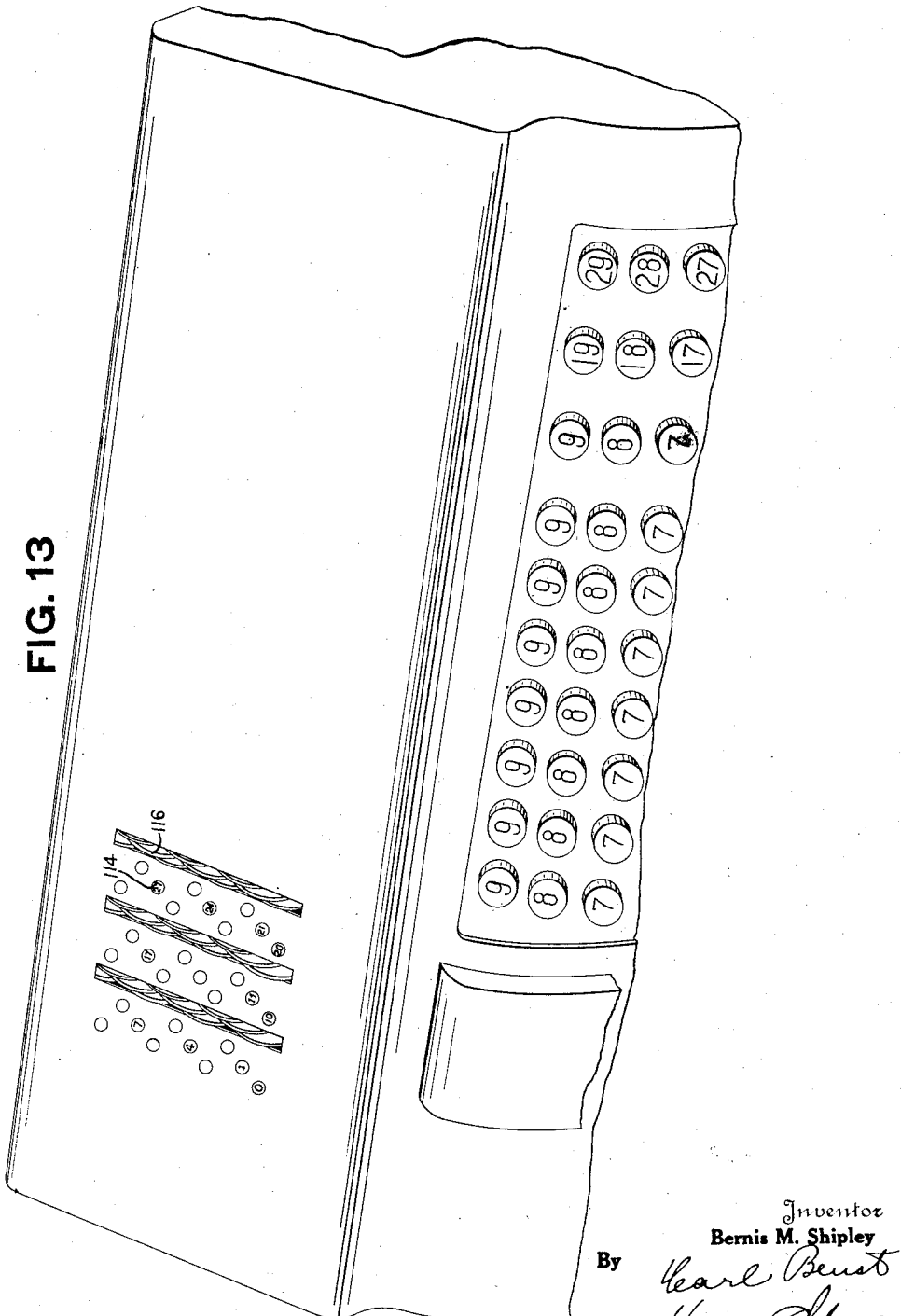
Inventor
Bernis M. Shipley
By Carl Beust
Henry E. Stauffer
His Attorneys Dec. 29, 1931.  B. M. SHIPLEY  1,838,579
CASH REGISTER
Filed July 13, 1925  10 Sheets-Sheet 8

Inventor
Bernis M. Shipley
By Carl Beust
Henry Stauffer
His Attorneys

Dec. 29, 1931.　　　B. M. SHIPLEY　　　1,838,579
CASH REGISTER
Filed July 13, 1925　　　10 Sheets-Sheet 9
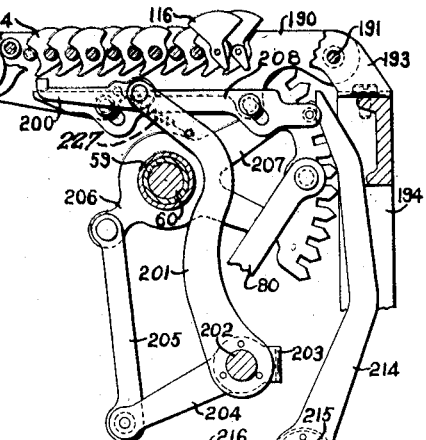
FIG. 15
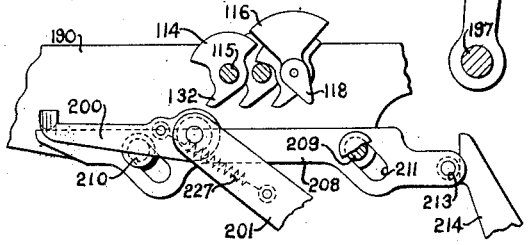
FIG. 16
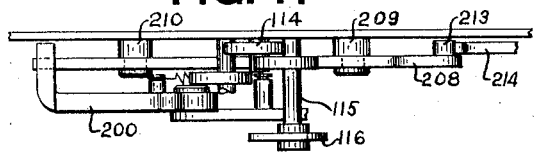
FIG. 17
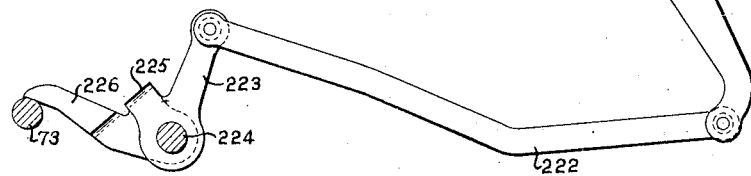
Inventor
Bernis M. Shipley
By Carl Beust
Henry E Stauffer
His Attorneys Dec. 29, 1931.    B. M. SHIPLEY    1,838,579
CASH REGISTER
Filed July 13, 1925    10 Sheets-Sheet 10

Inventor
Bernis M. Shipley
By Earl Beust
Henry E. Stauffer
His Attorneys

Patented Dec. 29, 1931

1,838,579

UNITED STATES PATENT OFFICE

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed July 13, 1925. Serial No. 43,246.

This invention relates to cash registers, and more particularly to machines of the type shown and described in Letters Patent of the United States No. 1,394,256, issued to F. L. Fuller on October 18, 1921, and No. 1,619,796, issued to applicant on March 1, 1927.

One object of this invention is to provide a machine of the type above mentioned, which has a plurality of totalizers, with a series of indicators to show which of the totalizers have been operated.

Another object is the provision of mechanism for actuating selected indicators only when selected totalizers are engaged with their actuators for adding.

Still another object is the provision of simple, compact and inexpensive indicating means readily movable into non-indicating position when desired.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said drawings:

Fig. 3 is a detail view showing the totalizer indicators, and the totalizer selecting mechanism by which the indicators are also selected.

Fig. 4 is a detail view of the mechanism for resetting one of the groups of indicators.

Fig. 5 is a side elevation of a part of the totalizer engaging and disengaging mechanism, together with the means for selecting and operating the indicators in the group corresponding to the front totalizer line.

Fig. 6 is a detail perspective view of one of the indicator elements.

Fig. 7 is a detail side elevation of the mechanism for selecting and operating the group of totalizers appropriate to the upper totalizer line.

Fig. 8 is a detail side elevation of the mechanism for selecting and operating the group of indicators appropriate to the rear totalizer line.

Fig. 9 is a detail sectional view taken on the line 9—9 of Fig. 10 looking in the direction of the arrows.

Fig. 10 is a detail side elevation on an enlarged scale of one of the groups of indicators with a portion of the mechanism broken away for the sake of clearness.

Fig. 11 is a detail front elevation of the indicators and their resetting devices, as they appear through the openings in the machine cabinet.

Fig. 12 is a rear elevation partly broken away, showing the rear totalizer line and various other mechanisms.

Fig. 13 is a perspective view showing the appearance of a modified form of this invention as applied to a machine not having the usual amount indicators.

Fig. 15 shows the mechanism for selecting and operating the group of indicators of the modified form, appropriate to the front totalizer line.

Fig. 16 is a detail side elevation of the selecting and operating means for one of the groups of indicators of the modified form.

Fig. 17 is a top plan view of the mechanism shown in Fig. 16.

General description

Machines of the type to which this invention is shown applied, may be provided with from one to thirty totalizers, and it has been found in the past that when it was desired to reset the operated totalizers to zero, it was necessary to reset all of them in order to be certain that none of them had any amounts therein, as there was no way by which the operator could tell whether or not all of the totalizers had been operated. This invention, therefore, provided means in the form of small indicators, bearing numbers corresponding with the numbers indicating the totalizers, which indicators are automatically brought into view through openings in the cabinet when their corresponding totalizers have been selected and engaged with the actuators.

With this invention in use, the operator by glancing at the indicators, can easily ascertain which of the totalizers have been operated, and which it is, therefore, necessary to reset, thereby saving considerable time in the resetting operation, especially where a large number of totalizers are employed.

Means is provided for manually returning the operated indicators to their normal non-indicating positions when the resetting operations of the corresponding totalizers have been completed.

Description of machine

The machine to which the above invention is applied is of a type which is old and well known in the art, and described and illustrated in detail in the patents above mentioned. It is, therefore, thought that it will be unnecessary to include anything but a brief description thereof in this application.

Figure 1:
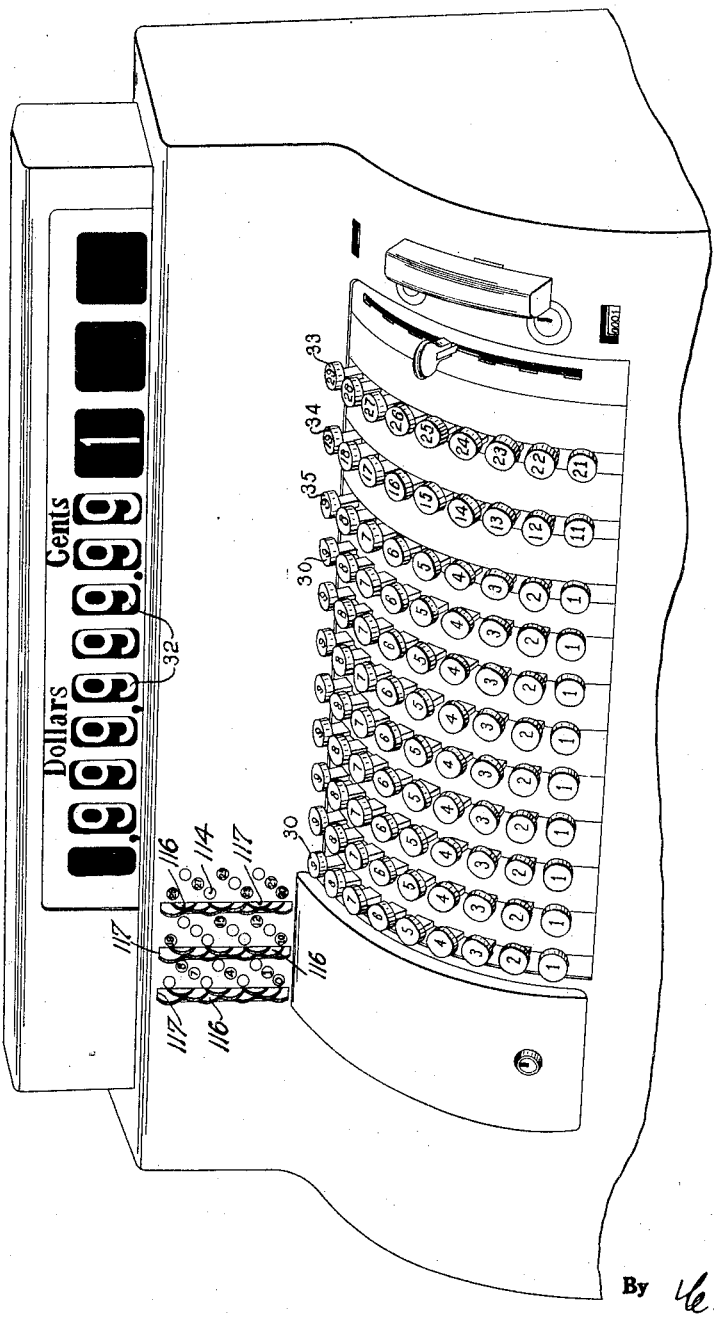
Fig. 1 is a perspective view of the machine to which this invention is shown applied.

The machine is provided with a plurality of banks of amount keys 30 (Fig. 1), which are adapted to cooperate with the well known differential mechanism for adjusting indicators 32, as well as setting up appropriate type wheels (not shown), and adding the amounts set up, on one or more selected totalizers. To the right of the amount banks are three banks of so called control keys 33, 34 and 35. Each of these banks contains nine keys, and each of these keys is adapted to select an appropriate totalizer. The means whereby the control keys select the totalizer will be hereinafter described.

Figure 2:
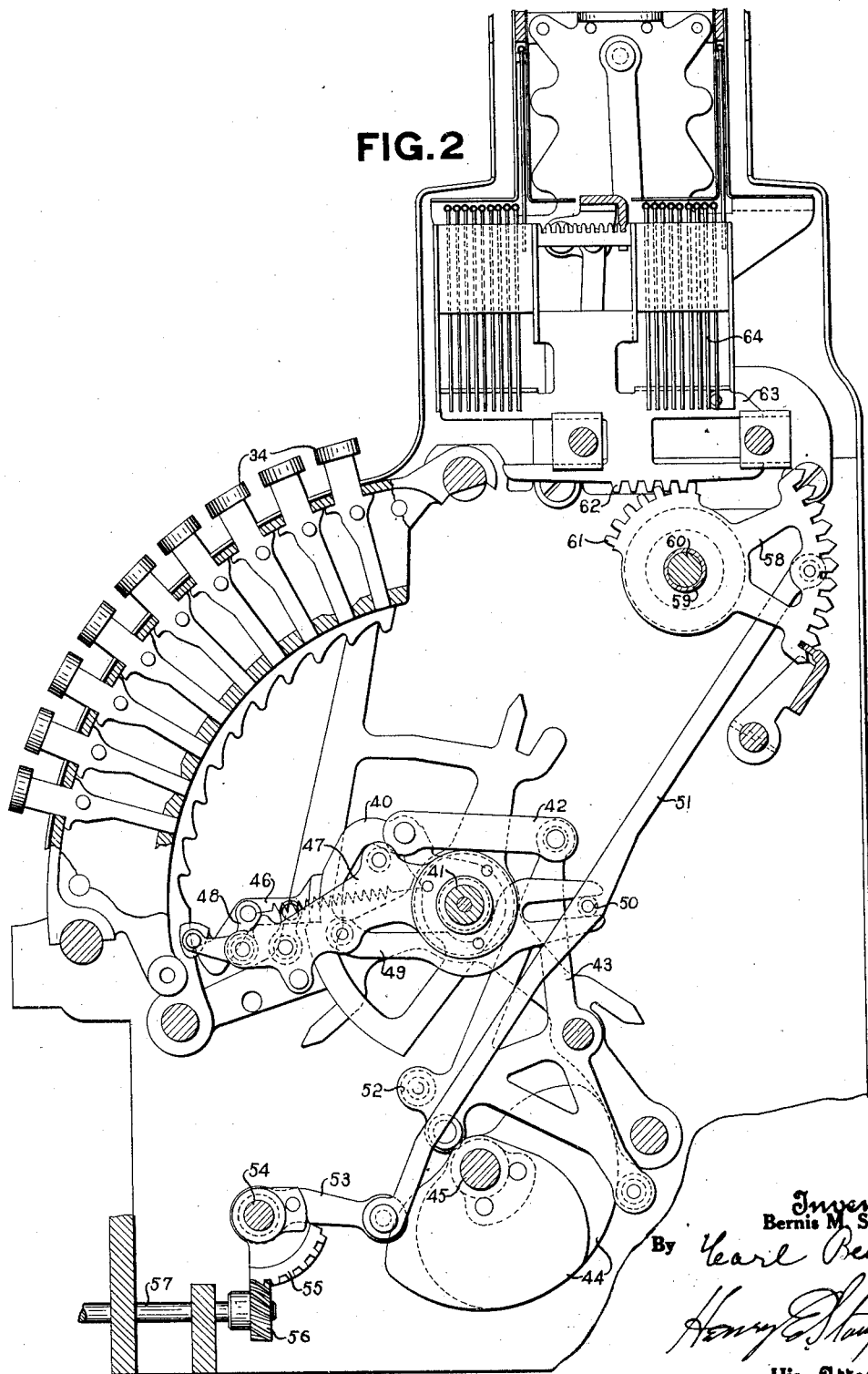
Fig. 2 is a sectional view through the machine, taken just to the right of the second or middle control key-bank.

Fig. 2 shows the second or middle control bank of keys 34, together with the differential mechanism which cooperates with this particular bank. The differential mechanisms for the first and third banks of control keys are a duplication of the differential mechanism for second bank of keys.

This differential mechanism consists of a driver 40, which is rocked first clockwise and then counter-clockwise about a hub 41, by means of a link 42 and a Y-shaped lever 43, rocked by a pair of cams 44, fast on a main drive shaft 45 of the machine. This main drive shaft is given a complete counter-clockwise rotation during each cycle of operation of the machine by mechanism very well known and shown in the above mentioned patents, and which will not be described herein.

The driver 40 is normally connected by means of a latch 46, to a differentially movable arm 47, loose on the hub 41. As the driver 40 moves in its clockwise direction, the differentially movable arm is carried with it until the forward end of a bell crank lever 48 carried by the differentially movable arm, strikes the inner end of whichever one of the keys in its appropriate bank has been depressed.

The latch 46 will then be disconnected from the driver 40, which will continue its clockwise movement, leaving the differentially movable arm in whatever position it had reached when the latch was disengaged. Pivoted to the differentially movable arm 47 is a beam 49, which at its rear end is bifurcated, and cooperates with a pin 50, mounted on a link 51. The left hand end of the beam 49 is positioned in accordance with the differential movement of the arm 47, and after this movement of said arm has been completed, the link 51 is moved differentially, in accordance with the position of the arm 47, by means of a roller 52, carried by the Y-shaped lever 43, which cooperates with the beam and moves its bifurcated end to a position of differential adjustment appropriate to the adjustment of the differential arm 47.

At its lower end the link 51 is pivoted to an arm 53, loose on a rod 54, and secured to a spiral gear segment 55, which meshes with a spiral pinion 56, fast on a shaft 57. It can be seen from the above that the differential movement of the arm 47 in accordance with the key depressed, is through the link 51, arm 53, spiral gear segment 55 and spiral pinion 56, transmitted to the shaft 57, which through connections not shown in this machine, but old in the art, sets up an appropriate type wheel, in order that the amount or symbol on the depressed keys may be printed on an appropriate printing medium.

At its upper end the link 51 is pivoted to an indicator segment 58, fast on a sleeve 59 surrounding a shaft 60, supported by the machine side frames. The segment 58 has teeth 61 formed thereon, which mesh with teeth 62 on an indicator setting rack 63, so that the differential movement imparted to the link 51 will be transmitted to the indicator rack 63, and position the indicator tablets 64, so that the appropriate one may be exposed at the proper time.

The indicator mechanism shown in Figure 2 is old and very well known in the art and illustrated and described in Letters Patent of the United States, No. 1,163,748, granted to F. L. Fuller on December 14, 1915, and it is not thought that any further description thereof need be given herein, as it has no connection with the present invention.

Totalizers

Machines of this type, as is well known, are provided with three lines of totalizers. Each totalizer line includes a plurality of totalizer wheels 70, loosely mounted on a tube 71 (Fig. 12).

The tubes 71 are carried at each end by frames 72 (Figs. 3 and 12), slidably mounted on shafts 73, in a manner well known in machines of this type, and shown in Figures 3 and 12. Each totalizer on a totalizer line consists of one totalizer wheel in each group of wheels, there being a group of ten wheels appropriate to each denomination. The totalizers are moved laterally of the machine, to bring any desired totalizer into co-operative relation with the actuators 74, (Fig. 12) adjusted by the differential mechanism of the amount bank not shown herein, but shown and described in the above mentioned patents.

Totalizer selecting mechanism

The mechanism for sliding the totalizer lines laterally of the machine, to select any particular totalizer for operation, under the control of the appropriate banks of control keys will now be described.

The frames 72 (Fig. 3) which support the totalizer lines at their lefthand ends, carry bosses thereon, in which rods 75 are mounted. Each of the rods 75, carries a square stud 76, which projects into a cam groove 77 (Fig. 12) in a segmental cam 78, loosely mounted on a stud 79, projecting from the machine side frame. There is one of these segmental cams co-operating with each of the three totalizer lines, and these cams 78 are connected by links 80, with segments 81, one of which is fast on the shaft 60 and the other two segments 81 are secured, one to each of the sleeves 59, previously described.

It will be remembered that also fast on the shaft 60 and the sleeves 59, are the indicator segments 58, which are differentially adjusted by the three banks of control keys. The differential movement, therefore, of one of the differential arms 47, corresponding to a particular bank of control keys will through the segment 58, shaft 60, or one of the sleeves 59, segment 81, and link 80, adjust its corresponding segmental cam 78 differentially, in accordance with the key depressed in the associated control bank. This differential movement of the cam 78, will slide the totalizer line appropriate thereto, laterally of the machine, in a manner which is very well known, and to bring the selected totalizers thereon into co-operative relation with the actuators.

Totalizer engaging mechanism

Means is provided for rocking the totalizer lines, to engage the selected totalizers with the actuators after the desired totalizer on each line has been moved into alignment with the actuators. This rocking means is also very old and well known in machines of this type, and only enough thereof will be described in this application, to enable an understanding of the invention.

Fast on each of the shafts 73, which support the totalizer lines, is an arm 90 (Fig. 5), which carries a roller 91 projecting into a cam slot 92 in a guide plate 93, supported by the side frame. The arm 90 is pivoted to a link 94, which carries a pin 95 engaged by a hook 96, carried by a totalizer engaging and disengaging spider 97, loose on a stud 98. At the proper time in the operation of the machine the spider 97 is rocked first clockwise and then counter-clockwise to its normal position by mechanism which will be hereinafter described.

Upon the clockwise movement of the totalizer engaging and disengaging spider 97, the link 94 will rock the arm 90 and shaft 73 counter-clockwise, and at the same time, due to the shape of the cam slot 92 in the guide plate 93, it will move the totalizer line toward the center of the machine a sufficient distance to engage the selected totalizer with the actuators. The totalizer line will be held in this position until the proper amount has been added thereon, when it will be returned to its normal position, in a well known manner. Means for rocking the totalizer engaging and disengaging spider 97 first clockwise and then counter-clockwise to normal position, will now be described. Fast on the main drive shaft 45 (Fig. 5) of the machine, is a pair of cams 99, which co-operate with rollers carried by a lever 100, pivoted to a subframe of the machine. To the lever 100 is pivoted a link 101, which at its lefthand end (Fig. 5) is slotted, and surrounds a stud 102, carried by a shifting lever not shown, since it forms no part of the invention. The link 101 is formed with a substantially square clearance opening in its center portion which surrounds the stud 98. The link 101 has a notch 103, which normally co-operates with a pin 104, carried by the totalizer engaging and disengaging spider 97. The formation of the cam 99 is such that at the proper time the lever 100 is rocked clockwise, to move the link 101 to the right to rock the spider 97 clockwise to move the selected totalizers into engagement with their actuators 74. When the proper amount has been added in the selected totalizer, the cams 99 rock the lever 100 counter-clockwise, which through the above described mechanism returns the spider 97 to its normal home position, and thereby returns the engaged totalizer lines to their normal positions to disengage the selected totalizers from their actuator 74.

Used totalizer indicators

The indicators which show whether or not a particular totalizer has been "used" or operated, are shown in Figures 4 to 12 inclusive. The lefthand side frame which supports the usual indicators of machines of this type, have projecting therefrom long studs 110 and 111 (shown at the right, Fig. 12). These studs, together with a shaft 112, support indicator frames 113, which carry the "used" totalizer indicators.

One of the individual indicators is shown in perspective in Figure 6. It includes a segmental indicator 114, which carries on its periphery a numeral or symbol corresponding to its appropriate totalizer. This segmental indicator is pinned on a short shaft 115, supported between two of the indicator frames 113, as shown in Figure 9. Secured to the shaft 115 is a manually operated indicator resetting segment 116, used to restore the indicator 114 to its non-indicating position at any time.

The individual indicators 114 are mounted in the indicator frames 113, as above noted, and are staggered in order to save space. The indicators in the lefthand group (Fig. 11) are numbered from "0" to "9", in the middle group from "10" to "19", and in the righthand group from "20" to "29".

The manual resetting segments 116 are also staggered and project through slots 117 in the cabinet of the machine. The manual resetting segments 116 have rearwardly extending retaining arms 118 which co-operate with spring plungers 119, carried in a vertically mounted plunger supporting bar 120, supported between two of the frames 113 (Figures 4 and 9). Figure 4 shows the resetting segments in their normal positions, in which it can be seen they are flexibly supported or held by the spring plungers 119.

When however, the indicators 114 are moved to their indicating position, the resetting segments 116 will be rocked clockwise, thereby moving the retaining arms 118 thereof from the positions shown in Figure 4, to positions in which the retaining arms 118 lie just below their corresponding spring plungers, which spring plungers hold the manually resetting segments and the indicators in their indicating positions.

When it is desired to reset the indicators to their non-indicating positions, all that is necessary is for the operator to run his finger downward over the manual resetting segments 116, and any segments previously moved when the indicators corresponding thereto exposed their symbols will thereby be rocked counter-clockwise, and the indicators will be returned to non-indicating positions, where they will be held by their corresponding spring plungers 119.

Each of the indicators cooperates with the shaft 115 next below it. In the normal positions of the parts the shaft 115 just below any of the indicators lies in the plane of that indicator and limits the counter-clockwise movement thereof. When an indicator is rocked clockwise to its indicating position, a tail 132 formed thereon, contacts the shaft 115 next below the operated indicator to limit its clockwise movement.

Indicator selecting mechanism

A view of the indicator selecting mechanism on an enlarged scale is shown in Figure 10. Supported by the middle one of the indicator frames 113, for each of the groups of indicators, as shown in Fig. 9, are two vertically mounted carriage guides 121 and 135. These guides are cut away on the side next to the frame, in order to form a channel in which is mounted a vertically slidable indicator-selecting carriage 122. The carriage 122 normally rests at the bottom of the channel formed by guides 121 and 135, and it is moved upwardly from this position differentially, in accordance with the differential movement of its corresponding control bank. The means whereby this mechanism is moved upwardly, will now be described.

In the groups of indicators corresponding to the front and back totalizer lines, the mechanism is as follows: Fast on the righthand ends (Figure 12), of the two sleeves 59, which surround the shaft 60, are the segments 81 (see also Figs. 5 and 8). It will be recalled that these segments are adjusted differentially by the differential mechanism of their appropriate control banks, in order to select the desired totalizers in the front and back totalizer lines, for operation. Pivoted to each segment 81 (Fig. 5) is an upwardly extending link 125, which at its upper end is pivoted to one end of a lever 126, loose on a shaft 127, supported by the frames 113. At its lefthand end the lever 126 is bifurcated, and co-operates with a pin 134, on the indicator selecting carriage 122.

When the segment 81 is rocked in clockwise direction to an extent corresponding with the key depressed in its appropriate control bank, the link 125 is lowered and rocks the lever 126 clockwise to raise the selecting carriage 122 in the slide formed by guides 121, to an extent corresponding with the key depressed.

The mechanism shown in Figure 7 is for positioning the indicator-selecting carriage 122 for the upper totalizer line, and this mechanism is also identical with that above described, with the exception that the link 125 is pivoted at its lower end to an arm 133, fast on the shaft 60 instead of being secured to a segment, such as the one shown in Figures 5 and 8. With this exception the mechanism operates in exactly the same maner as that previously described, and no further description thereof will be given. The corresponding parts in the different figures have been given the same reference numerals.

*Indicator operating mechanism*

After the indicator-selecting carriages 122 have been moved upwardly differentially, in accordance with the keys depressed in their corresponding control banks, means is provided for operating the indicators so selected, and this means will now be described. As has already been pointed out, the indicator operating mechanism is actuated by the movement of the totalizer lines to their engaging positions, and the mechanism whereby the movement of the front totalizer line into engaging position operates the selected indicator in the group corresponding to this line, will now be described.

Each of the indicator-selecting carriages 122 carries an indicator actuator 129 (Figures 5, 7, 8, and 10) slidably mounted on studs 130, projecting laterally from the carriage 122. Each of the actuators 129 (Fig. 9) has a finger 131 wide enough to cooperate with tails 132 of the indicators 114 of three vertical rows constituting one set of indicators. The indicator actuator 129 is normally held in its righthand position, as shown in Figure 5, by means of a spring 140, stretched between an upwardly extending ear of the indicator actuator 129, and an upwardly extending ear of the indicator-selecting carriage 122. When the indicator-selecting carriage 122 is moved upwardly, the finger 131 of the actuator 129 is positioned behind the tail 132 of the indicator 114, corresponding to the totalizer selected. After the carriage 122 has been so positioned, the actuator 129 is slid laterally to the left, as viewed in Figure 5, and when this occurs, the finger 131 strikes the tail 132 of the selected indicator and rocks said indicator 114, the shaft 115 and the resetting segment 116 clockwise far enough to position the retaining arm 118 on the lower side of its appropriate spring plunger 119, which will thereupon hold the parts in their moved positions. The above described mechanism is the same for each of the three groups of indicators, and therefore it is thought that the description of one of these groups of its actuating mechanism will be sufficient in this application.

The manner in which the indicator actuator 129 for the group of indicators corresponding to the front totalizer line, is moved to the left to actuate its particular totalizer indicator after said indicator has been selected will now be described. The guide 121 (Fig. 5) carries a stud 141, upon which is slidably mounted an indicator-actuator driver 142, which also has an opening surrounding the shaft 127. At its lefthand end the driver 142 is anvil-shaped and the lefthand edge thereof is parallel with the guides 121 and 135. The anvil-edge of the actuator driver is sufficiently wide to co-operate with the actuator 129 in any position to which this actuator may be moved by the indicator-selecting carriage 122.

At its righthand end the actuator driver 142 has a pin 143, (Fig. 5) which extends through a bifurcated end of a bell crank lever 144, loose on the shaft 112. At its other end the bell crank lever 144 is pivoted to a downwardly extending link 145, which at its lower end is connected to another bell crank lever 146, loosely mounted on a shaft 147, supported in the machine side frames.

The other arm of the bell crank 146 has a cam slot 148 formed therein, with which a pin 149, carried on the upper end of a lever 150, co-operates. The lever 150 is loosely mounted on a rod 151, and at its lower end this lever is pivoted to a link 152, which, is in turn pivoted to an arm 153, loose on a shaft 154 and connected by means of a yoke 155 to an arm 156, which extends into the path of the totalizer frame supporting shaft 73. It can be seen from the above that when the totalizer frame supporting shaft 73 appropriate to the front totalizer line is moved to engage the selected totalizer thereon with the actuators 74, the arm 156 will be rocked clockwise, which movement through the yoke 155 and arm 153 moves the link 152 toward the right, to rock the lever 150 counter-clockwise. This movement of the lever 150, through the engagement of the pin 149 with the cam slot 148 in lever 146, rocks this lever in counter-clockwise direction, thereby through the link 145, to rock the bell crank lever 144 also counter-clockwise, and slide the indicator-actuator driver 142 to the left. The anvil edge on the lefthand side of the actuator driver 142 will through its contact with an arm 157 of the indicator actuator 129, move said actuator toward the left against the tension of the spring 140.

The movement of the actuator 129 toward the left, as above described, rocks the selected indicator 114, to expose its symbol. Of course, after a particular totalizer has once been operated through the train of mechanism above described, the symbol will remain exposed until the indicator is reset by the operator. If the same totalizer is again operated before the indicator has been reset the actuator 129 will move idly and have no effect upon the indicator.

Mechanism will now be described whereby an indicator in the group corresponding to the upper totalizer line will be moved to expose its symbol when the upper totalizer line is rocked into totalizer engaging position.

This mechanism is shown in detail in Figure 7.

An anvil-shaped indicator actuator driver 164 is slidably mounted on the stud 141 and the shaft 127. This actuator driver 164 is very similar to the actuator driver 142, previously described in the description of the mechanism operated by the front totalizer line. The actuator driver 164 carries a pin 165, with which co-operates the upper end of a lever 166, the lower end of which has a hook 167, which lies beneath the totalizer frame supporting shaft 73, for the upper totalizer line. When the upper totalizer line is moved to engage the selected totalizer thereon with the actuator, the shaft 73 will strike the hook 167 of the lever 166, and rock this lever counter-clockwise, and moving the actuator driver 164 to the left, which will, as previously described, slide the actuator 129 to the left, for the purpose of moving the selected indicator 114 to expose its symbol.

The means for moving the selected indicator in the group corresponding to the back totalizer line, to expose its symbol is shown in Figure 8. This group of indicators has associated therewith an actuator driver 168, almost identical with the actuator driver 142, previously described. It is slidably mounted upon the stud 141 and the shaft 127. At its righthand end the actuator driver 168 carries a pin 169, co-operating with a bifurcated end of a bell crank lever 170, loosely mounted on the shaft 112. The other arm of the bell crank lever 170 is pivoted to a link 171, which at its lower end is pivotally connected to an arm 172, of a lever 173, loosely mounted on the shaft 147. The lever 173 has a downwardly extending arm 174, which has a cam slot 175 formed therein, through which projects a pin 176, carried by the upper end of an arm 177, loose on a rod 151. The arm 177 is connected by means of a yoke 178 to a downwardly extending arm 179, which is normally in the path of the totalizer frame supporting shaft 73, for the back totalizer line. It can be seen from the above description that when the back totalizer line is moved to engage the selected totalizer thereon with the actuators 74, the arm 179 will be rocked clockwise against the tension of the spring 180, connected to a projection of the arm 179 and a projection of the bell crank lever 173.

The clockwise movement of the arm 179 and arm 177, moves the pin 176 upwardly in the cam slot 175, and rocks the lever 173 counterclockwise, and through the link 171 rocks the bell crank lever 170 counterclockwise. This movement will slide the indicator-actuator driver 168 to the left and in the manner above described, move the indicator actuator 129 to the left, and moves the selected indicator 114 to expose its symbol,
where it will be held until it is reset by the operator.

*Modified form of the invention*

Figure 14:
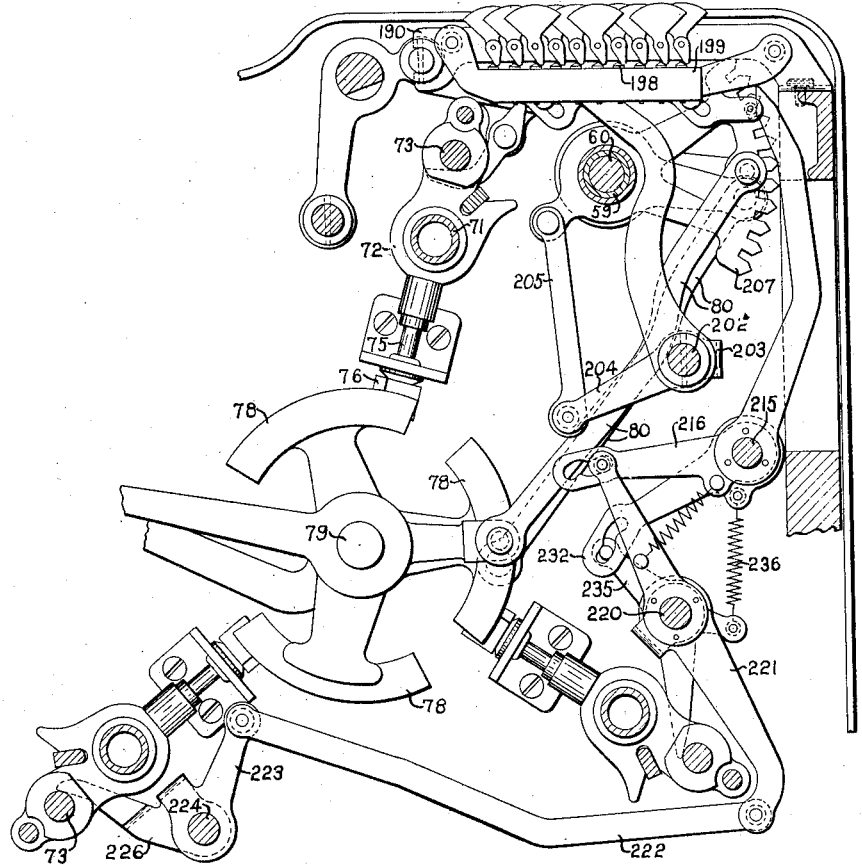
Fig. 14 is a side elevation of the totalizer selecting mechanism, and the manner in which the modified form of indicators is applied to the machine.
Figure 18:
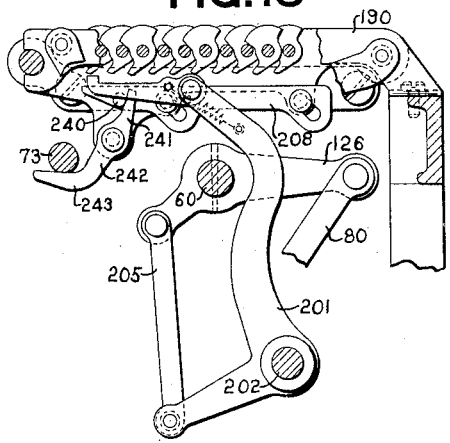
Fig. 18 is a detail view of the mechanism for selecting the group of indicators of the modified form, appropriate to the upper totalizer line.

A modified form of the invention is shown in Figures 13 to 20 inclusive. This form shows the invention adapted to a machine having no regular indicators, as has the machine shown in perspective in Figure 1. When used in a machine of the type with no regular indicators, the three groups of "used" totalizer indicators 114 are placed in a horizontal position, across the top of the machine. The indicators 114 can be seen through holes in the cabinet, and the manual-indicator resetting segments 116 extend through slots therein. The mechanism for differentially selecting the totalizers for operation, that is, sliding the totalizer lines laterally of the machine, is shown in Figure 14. This mechanism has already been described in the early part of this specification, and it is not believed to be necessary to repeat this description. The individual indicating elements used in the modified form are identically the same as those used in the preferred form of the invention, previously described, and the same reference numerals will be given thereto.

The indicating elements are supported by laterally extending frames 190, supported by studs 191 and 192, projecting from brackets 193 supported on the back frame 194 of the machine, and hangers 195 carried by rods 196 and 197, supported by the machine side frames. Although horizontally placed in the machine, the indicators have the same relative positions with each other that they have in the preferred form, previously described.

The retaining arms of the resetting segments 116, co-operate with spring plungers 198 (Fig. 14), mounted in a cross-bar 199. Co-operating with each of the groups of indicators is a selecting finger 200 (Fig. 16), the end of which is extended, as shown in Figure 17, and co-operates with all of the indicators in its group. The finger 200 is pivoted to the upper end of an arm 201 (Figures 15 and 16) loose on a shaft 202, supported by the machine side frame. The arm 201 is connected by means of a yoke 203, to an arm 204, pivoted to the lower end of a link 205, connected at its upper end to an extension 206, of a segment 207 fast on the left-hand end of the outside one of the sleeves 59, which surrounds the shaft 60. This segment is differentially adjusted by means of its appropriate control bank, in the manner well known in machines of this type, and previously described herein, and through this movement, moves the link 205 upwardly, thereby rocking the arm 204 and arm 201 clockwise about the shaft 202 to move the selecting finger 200 toward the right, as viewed in Figure 15, and the extended end thereof will take up a position beneath whichever one of the indicator tails 132, corresponds with the key depressed in the corresponding control bank. A spring 227 is stretched between a pin on the selecting finger 200 and a pin on the arm 201, and therefore, when the arm 201 moves clockwise about the shaft 202, the lefthand end of the selecting finger 200 will be held in engagement with the flat upper surface of a bar 208 slidably mounted on two studs 209, projecting from the indicator frame 190.

After the selecting finger 200 has been positioned in accordance with the key depressed in the control bank corresponding thereto, the bar 208 will be slid toward the left, as viewed in Figure 16. This bar 208 has two slots 211, which surround the studs 209 and 210. When the bar 208 is forced to the left, the angular slots 211 cause the bar to move upwardly. When this occurs the end of the selecting finger 200 will be brought into contact with the tail 132, of whichever one of the indicators 114 it has selected and this indicator will then be rocked clockwise to expose its symbol, as in the preferred form.

The means for rocking the selecting finger 200 and the bar 208, to operate the selected indicator in the group corresponding to the front totalizer line, will now be described. The bar 208 (Figs. 14 and 15) associated with this totalizer line carries a projecting pin 213, with which the upper end of an arm 214 co-operates. The arm 214 is loose on a rod 215, and is connected by means of a hub with an arm 216, which has a cam slot 217 formed therein. Co-operating with the cam slot 217 is a pin 218, carried by the upper end of an arm 219, loose on a shaft 220 and connected by means of a yoke to an arm 221, connected by a link 222 to an arm 223, loose on a shaft 224. The arm 223 is connected by yoke 225, to an arm 226, which normally lies in the path of the totalizer frame supporting shaft 73, supporting the front totalizer line. It can be seen from Figure 15, that when the front totalizer line is moved to engage the selected totalizer thereon with the actuators 74, the arm 226, yoke 225 and arm 223 will be rocked clockwise, which movement through the link 222 rocks the arms 221 and 219 counter-clockwise.

Due to the conformation of the cam slot 217, the movement of the pin 218 when moved by the arm 219 rocks the arms 216 and 214 counter-clockwise, and the upper end of the arm 214 by its contact with pin 213, and moves the bar 208 to the left, and the slots 211 raise the lefthand end of the selecting finger 200, far enough to operate the selected indicator 114.

Figure 19:
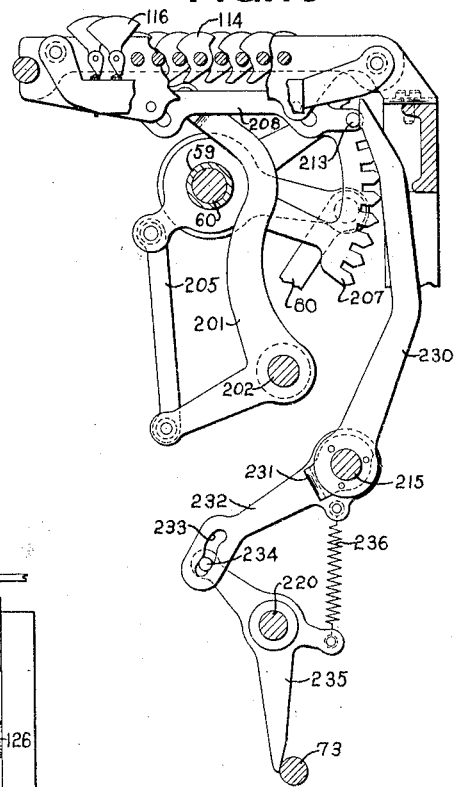
Fig. 19 is a detail view partly in section, of the group of indicators of the modified form, and the mechanism cooperating therewith, appropriate to the rear totalizer line.
Figure 20:
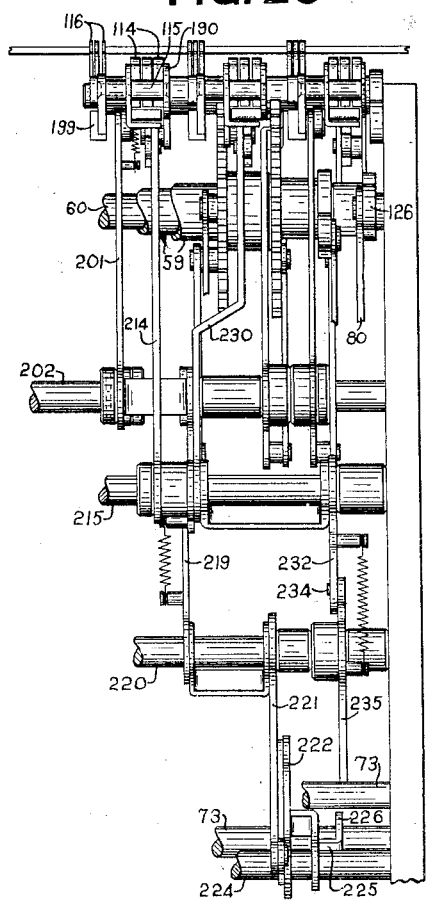
Fig. 20 is a rear elevation of the three groups of indicators of the modified form, and some of the mechanism by which they are operated.

Figure 19 shows the mechanism for operating the bar 208, for the group of indicators 114 corresponding to the rear totalizer line. The pin 213 on the bar 208 co-operates with the upper end of an arm 230, loosely supported by the shaft 215, and connected by means of a yoke 231, to an arm 232, having a cam slot 233 formed at its lower end. A pin 234 carried by a lever 235 co-operates with the cam slot 233. The lever 235 is loose on the shaft 220 and the lower end of this lever lies in the path of the totalizer frame supporting shaft 73, for the rear totalizer line. The lever 235 is normally held against the shaft 73 by means of a spring 236, stretched between an extension of the lever 235 and a pin on the arm 232. When the rear totalizer line moves to engage the selected totalizer thereon, the lever 235 is rocked clock-wise, and due to the shape of the cam slot 233, the arms 232 and 230, are rocked counter-clockwise, and the upper end of the arm 230 being against the pin 213, and moves the bar 208 toward the left to operate the selected indicator 114 to expose its symbol.

The means for adjusting the selecting finger 200 for the group of indicators corresponding to the rear totalizer line, is identical with that for the front line, and therefore it is not believed to be necessary to include any further description of this mechanism herein.

In the group of totalizers corresponding to the upper totalizer line, the mechanism for actuating the selected indicator is very simple. The bar 208 for this totalizer line carries a pin 240 (Fig. 18) with which an upwardly extending arm 241 of a lever 242 co-operates. This lever is pivoted on a stud supported by a downwardly extending ear of the frame 190, and the substantially horizontal arm 243 extends beneath the totalizer frame supporting shaft 73, for the upper totalizer line. When the upper totalizer line is moved to engage the selected totalizer thereon with the actuators 74, the lever 242 is rocked counter-clockwise, and through the engagement of the arm 241 with the pin 240 on the bar 208, the bar is moved toward the left and raises the selecting finger into engagement with the tail of the selected indicator 114 to operate the same to expose its indicia.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

What is claimed is:

1. In a cash register, the combination of a plurality of totalizers carried in a frame adapted to move to engage a selected totalizer with actuators therefor; a totalizer frame supporting shaft; totalizer selecting means; a plurality of related indicators adapted to be selected by the totalizer selecting means; and means operated by the totalizer frame supporting shaft to move the selected indicator to expose the indicator to view, when the selected totalizer is moved into position to be operated by the actuators.

2. In a cash register, the combination of a plurality of totalizers carried in a frame adapted to move to engage a selected totalizer with actuators therefor; totalizer selecting means; an indicator for each totalizer to indicate whether an amount is on the corresponding totalizer all of the indicators adapted to be displayed at one time; means connected with the totalizer selecting means to select a corresponding indicator; and means to move the selected indicator to its displaying position.

3. In a machine of the class described; the combination of a plurality of totalizers; an indicator associated with each totalizer to indicate when its corresponding totalizer has an amount thereon; means to move each indicator into displaying position; a finger-piece connected with each indicator, all of said finger pieces being arranged in close proximity to each other for manually resetting all of the indicators by a single stroke of the operator's finger.

4. In a machine of the class described; the combination of a plurality of totalizers; an indicator associated with the totalizers to indicate when its corresponding totalizer has an amount thereon; means to move each indicator into displaying position; a segmental-shaped finger-piece connected with each indicator, said segmental-shaped finger-pieces arranged in a line and closely together for resetting all the indicators at a single stroke of the operator's finger.

5. In a machine of the class described, the combination of a plurality of totalizers; a common support therefor; actuators therefor; totalizer selecting means; totalizer engaging devices; a plurality of indicators, one for each totalizer to designate when the respective totalizers have been operated; a slidable indicator selecting carriage; an indicator actuator common to all indicators, and carried by said carriage and adapted to slide relatively and at right angles thereto; linkages connecting the carriage with the totalizer selecting means to move the carriage into a position corresponding to the totalizer selected; and means operated by the totalizer support when the totalizer engaging devices are operated, to operate the indicator actuator to move the selected indicator into exposing position, said last-mentioned means including an anvil-shaped slidable member to operate said indicator actuator when the latter is in any of its adjusted positions.

6. In an indicating mechanism, the combination with an indicator having a normally hidden symbol; of a tail on the indicator; operating means to contact the tail to adjust the indicator to expose the symbol, said tail adapted to remain out of cooperating relation with the operating means after being operated; and a device to shift the indicator at will to move the tail back into cooperating relation with the operating means.

7. In a cash register, the combination of a plurality of totalizers, a supporting shaft therefor, totalizer actuators, a plurality of indicators, one for each of said totalizers, common means for selecting the totalizer and indicator to be operated, means for engaging the selected totalizer, and means actuated by said totalizer supporting shafts when the totalizers are engaged with their actuators for operating the selected indicator.

8. In a cash register, the combination of a plurality of totalizers, means for differentially selecting said totalizers for actuation, a plurality of indicators, one for each of said totalizers, means for differentially selecting said indicators in accordance with the totalizer selected, and means for engaging said totalizer and for operating said selected indicator through the totalizer.

9. In an indicating mechanism, the combination of an indicating member having a normally hidden symbol, operating means for rocking said member to expose said symbol and to take the member from control of the operating means, a shaft carrying said member, and means to move the member into position to be controlled by the operating means and carried by said shaft and adapted to restore said symbol to its hidden position.

10. In a machine of the class described, the combination of a plurality of totalizers; a plurality of indicating elements, one for each totalizer; actuating means to add into the totalizers; a slidable member adjacent all of said indicating elements; means for positioning the slidable member adjacent any particular one of said elements in order to select it for operation; and operating means for the slidable member to adjust the selected indicator element to indicate whether an amount is in the totalizer.

11. In a machine of the class described, the combination of a plurality of totalizers; a plurality of indicating elements, one for each totalizer; actuating means to add into the totalizer; a slidable member adjacent all of said indicating elements; means for positioning the slidable member adjacent any particular one of said elements in order to select it for operation; and a member carried by said slidable member for actuating the selected indicator element to indicate whether an amount is in the totalizer.

12. In a machine of the class described, the combination of a plurality of totalizers; a plurality of indicating elements, one for each totalizer; actuating means for the totalizers; a slidable member adjacent all of said indicating means; means for positioning the slidable member adjacent any particular one of said elements in order to select it for operation; and a shiftable device carried by said slidable member for actuating the selected indicating element to indicate whether an amount is in the totalizer.

13. In a machine of the class described, the combination of a plurality of totalizers; a plurality of indicating elements, one for each totalizer; totalizer actuators; a slidable member adjacent all of said indicating elements; means for positioning said member adjacent any particular one of said elements in order to select it for operation; a tail projecting from each of said indicating elements; and a shiftable device carried by said slidable member adapted to cooperate with the tail of the selected indicating element to move it into indicating position to indicate whether an amount is on the totalizer.

14. In a machine of the class described, a row of indicating elements, all of which are adapted to be displayed simultaneously; means differentially positionable along said row for selecting an indicating element; and means carried by said selecting means for operating the selected element.

15. In a machine of the class described, a row of indicating elements, all of which are adapted to be displayed simultaneously; a frame member; means movable on said frame for selecting an element for operation; and means movably mounted on said selecting means for operating a selected element.

16. In a machine of the class described, a row of indicating elements, all of which are adapted to be displayed simultaneously; a frame member; means movable on said frame for selecting an element for operation; means movably mounted on said selecting means for operating a selected element; and a means cooperable directly with said operating means for actuating the same.

17. The combination of a plurality of indicating elements, all of which are adapted to be displayed simultaneously, movable means positionable to select any one of said elements for operation, and operating means for said movable means having an engaging portion cooperable with said movable means in any one of its positions of adjustment.

18. The combination of a plurality of indicating elements arranged in a row, all of which are adapted to be displayed simultaneously; a selecting and operating member slidable along said row; and a slidable pitman provided with a wide end cooperating with said member in any one of its positions.

In testimony whereof I affix my signature.

BERNIS M. SHIPLEY.

CERTIFICATE OF CORRECTION.

Patent No. 1,838,579. Granted December 29, 1931, to

BERNIS M. SHIPLEY.

It is hereby certified that error appears in the printed specification of the above numbered patent requiring correction as follows: Page 4, line 3, strike out the word "engaged"; page 6, line 102, after "indicators" insert the numeral 114, and line 111, after "extended" insert the word laterally; page 8, line 101, claim 9, strike out the word "and" first occurrence, and insert the comma and words , said last named means being; and that the said Letters Patent should be read with these corrections therein that the same may conform to the record of the case in the Patent Office.

Signed and sealed this 16th day of February, A. D. 1932.

(Seal)

M. J. Moore,
Acting Commissioner of Patents.